Fig.-1

Fig_4

Fig_5

Fig_6

Fig_9

United States Patent Office 3,017,980
Patented Jan. 23, 1962

3,017,980
SYSTEM FOR AUTOMATICALLY CONTROLLING LINE FEEDING MECHANISM IN TYPEWRITERS OR LIKE MACHINES
Anthony D'Onofrio, West Hartford, Conn., assignor to Royal McBee Corporation, Port Chester, N.Y., a corporation of New York
Filed Oct. 22, 1959, Ser. No. 847,966
12 Claims. (Cl. 197—114)

This invention relates to systems for automatically controlling line feeding mechanisms in typewriters or like machines; more particularly it relates to a line feed mechanism control system having a photoresponsive device for detecting marks on a form whose progress through the typewriter is to be controlled; and specifically it relates to a control system wherein the photoresponsive device is employed in combination with novel logic circuitry adapted to exercise control over the line feed mechanism.

As disclosed in copending application Serial No. 837,391, the vertical control logic is such that when a mark is sensed, line feed stops. This logic requires that the form be properly aligned so that the column of vertical control marks will always be positioned at the printing station as the form moves in a vertical direction. If the column of control marks was not aligned but rather skewed with respect to the printing station, the marks would not be sensed and the form would feed right out of the machine.

In accordance with this invention the vertical control logic is such that only when a mark is sensed is another line feed initiated. Movement of the form out of the machine, if it is misaligned, is prevented with this logic inasmuch as the line feed will stop if no mark is sensed.

Briefly, the invention comprises in combination with a single photoelectric detector, novel circuitry, including circuitry for delivering power to a line feed mechanism control actuator, which overcomes difficulties heretofore encountered with photoelectric devices as a result of changes in ambient light intensity and voltage fluctuations, and which is effective only when line feed operations are initiated; serving thereafter to control the extent of line feeding in accordance with prepositioned marks on a form in the typewriter.

An object of the invention is to provide a novel vertical format control system for typewriters or like machines.

Another object of the invention is the provision of a vertical format control system which reduces a typist's work load by eliminating extra line feed key strokes.

Another object of the invention is the provision of a system for automatically controlling the vertical progress of a form in a typewriter in accordance with marks photoelectrically sensed therefrom.

A further object of the invention is in the provision of control circuitry adapted in response to marks photoelectrically sensed from a moving form whose progress is being controlled to initiate further movement of the form.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

The typewriter mechanism shown by way of example as embodying the invention in a preferred form is generally similar in many respects to the present Royal Electric Office Typewriter. Consequently only so much of the typewriter mechanism necessary to understand the invention is shown in the figures.

Figure 2:
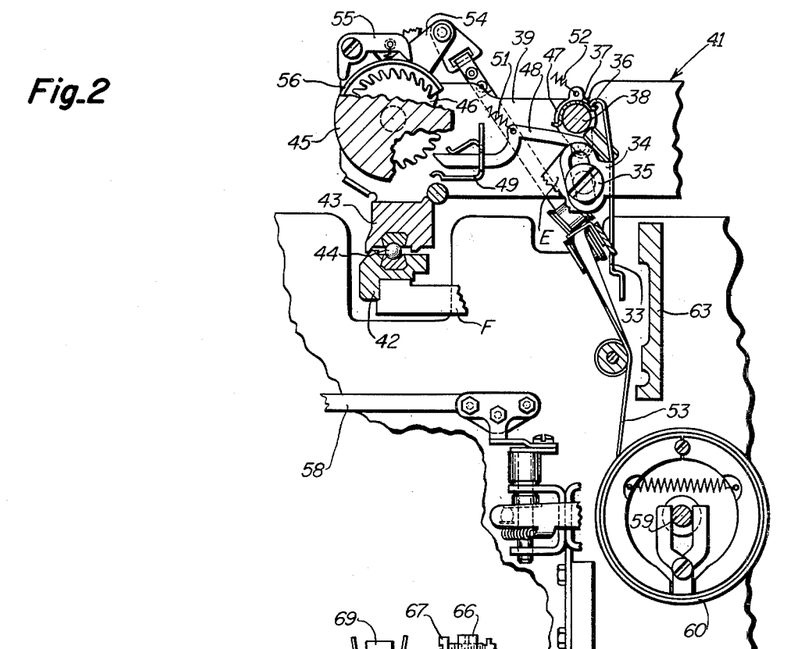
FIGURE 2 is a cross sectional elevation of the platen and feed ratchet and operating mechanism therefor.

Referring now to the figures wherein like reference numerals designate like or corresponding parts throughout the several views, the Royal Electric Office Typewriter repeat line space construction partially depicted in FIGURE 2, and more particularly described in Patent 2,728,438, is shown modified for operation by a line feed solenoid 11 suitably mounted on the typewriter frame and having its armature 12 connected so as to move a cam follower generally designated by reference numeral 13. The solenoid 11 is adapted to be energized upon closure of a skip switch 14 operable by a dummy key 15 provided on the typewriter keyboard, and, as will hereinafter be explained, upon closure of a switch operable in response to a carriage return operation.

Figure 1:
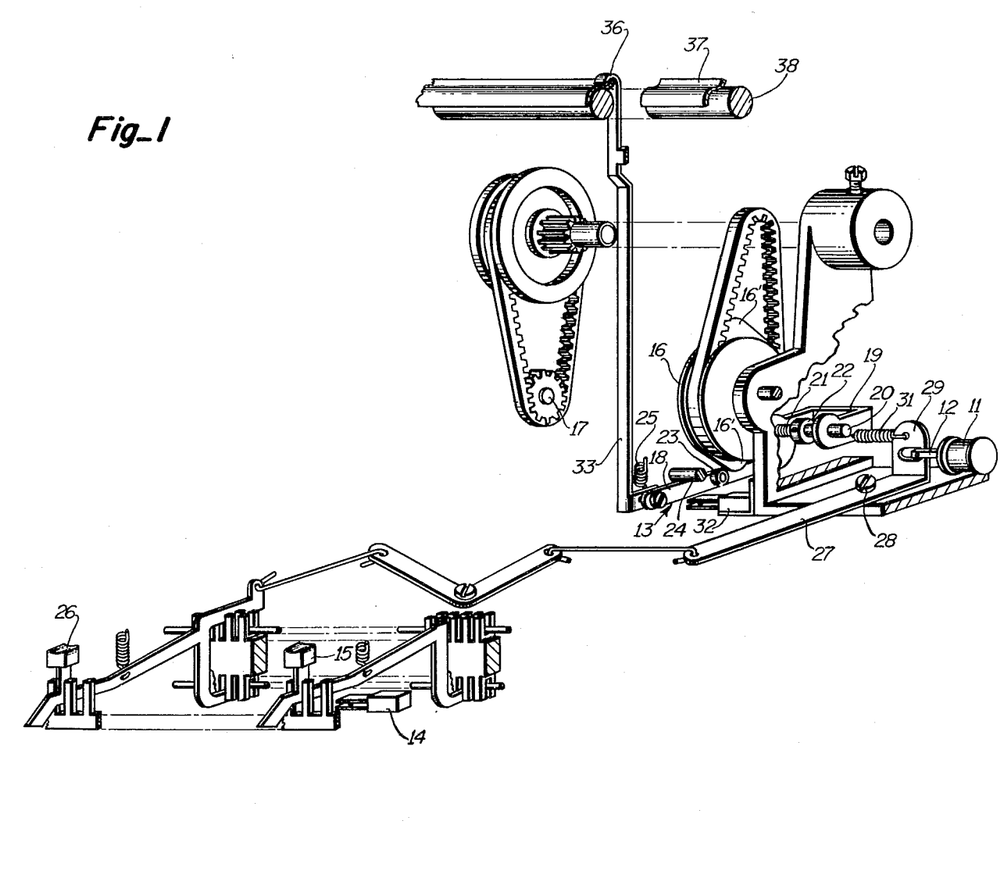
FIGURE 1 is a perspective view of line feed mechanism.

As more specifically disclosed in Patent 2,728,438 the repeat line space mechanism comprises a two lobed cam 16 adapted to be driven continuously by means of belt connected pulleys; the driving force being provided by a motor driven shaft 17. The cam follower 13 includes an arm 18 the rear end of which is comprised of a U-shaped part 19 which is mounted both to rock and to slide on a fixed shaft 20 which extends parallel to the cam axis of rotation. A normalizing spring 21 interposed between the follower arm and a collar 22 fixed on the shaft 20 urges the cam follower toward the left to the position shown in FIGURE 1 in which a cam follower roller 23 on the arm 18 is displaced from the plane of cam 16 so as not to be engageable by the cam lobes 16'. When the parts are positioned as shown in FIGURE 1, the follower arm 18 is held up against a stop 24 by a spring 25, the stop 24 so determining the upper or normal position of the follower roller 23 that the roller is closer to the cam axis than is the highest or most radially outward portion of either of the two cam lobes; the follower roller 23 however being further from the cam axis of rotation than the peripherally innermost portions of the cam between lobes 16'. As will be understood the cam follower 13 is adapted to be moved into engagement with the cam 16 by depression of a repeat line space key 26 or by energization of solenoid 11, both of which are adapted to rock a lever 27 pivoted at 28 on the typewriter frame. The rear end of lever 27 is formed with an ear 29 which is connected to the cam follower U-shaped part 19 by a yieldable motion transmitting spring 31, the arrangement being such that when lever 27 is rocked clockwise either by key depression or energization of solenoid 11, the spring 31 will yieldably pull the cam follower 13 toward the right against the urge of the normalizing spring 22 to position the roller 23 in the plane of the cam. Suitably mounted below the follower arm there is provided a line feed switch 32 adapted to be momentarily closed at the bottom of the follower arm stroke for reasons which will hereinafter appear. The forward end of the cam follower arm is connected to the lower end of an upwardly extending lever arm 33. As seen most clearly in FIGURE 2 the lever arm 33 is provided on its upper end with a slotted ear 34 adapted to receive a stud 35 suitably secured to the typewriter escapement frame E whereby lever arm 33 is retained in position and guided in its movement by the stud 35. As seen in FIGURES 1 and 2, the upper extremity 36 of lever arm 33 is bent over so as to engage a flange 37 on a repeat line space bail 38 rotatively mounted in the end plates 39 of a typewriter carriage generally designated by reference numeral 41 which, as is understood, is mounted for movement transversely of the typewriter frame F on a frame mounted lower track or rail 42 by means of a carriage or top rail 43 and ball rollers 44 only one of which is shown. The carriage is equipped with the usual cylinder or platen 45 rotatively mounted in the carriage end plates 39 and provided on one of its ends with an indexing ratchet 46. The end of bail 38 adjacent the ratchet 46 is provided with an arm 47 fixedly secured thereto, the lower end of which is pivotally connected to a pawl 48. The pawl 48 is guided by a slotted bracket 49 secured to the carriage top rail and biased by a spring 51 secured to the carriage end plate 39. A bail return spring 52 is also secured to the bail arm and to the carriage end plate.

Energization of solenoid 11 will move the cam follower 13 toward the cam 16, and when the cam roller 23 is between lobes it will move into the plane of the cam so that the latter will depress the cam follower 13 to initiate line feed operation and momentarily close line feed switch 32 at the end of each line feed motion. Line feed will continue as long as the key 26 is held depressed or the solenoid 11 remains energized. As will hereinafter appear, the momentary closing of the line feed switch 32, if a vertical control mark on the form is sensed during the line feed motion, will effect the continued energization of the solenoid, thereby continuing line feed operation.

Figure 3:
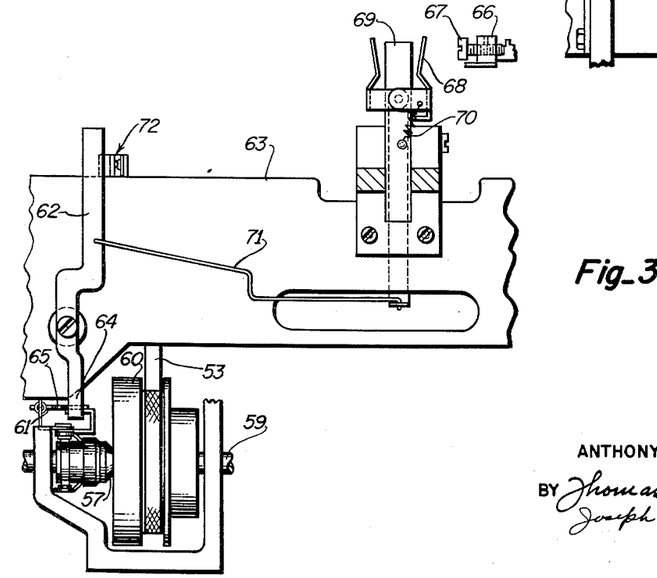
FIGURE 3 is a view of the carriage return clutch knock off mechanism.

Referring more particularly to FIGURES 2 and 3, other known parts of the Royal Electric Office Typewriter include a carriage return draw band 53 connected to a lever 54 which is adapted to rotate a pawl 55 adapted to engage the line space ratchet 46 on the platen so as to automatically effect, prior to return carriage motion, single, double, or triple line spacing each time a carriage return operation is initiated, depending on the set position of a shield 56 which determines the time of engagement of the pawl 55 with the ratchet. In accordance with the invention a zero line feed set point is provided by extending the shield 56 with the result that no line spacing will occur by reason of the draw band connection prior to carriage return movement when form sensing.

The carriage return mechanism includes as seen in FIGURES 2 and 3, a clutch operating cone 57 adapted to be moved toward the right as viewed in FIGURE 3 through movement of carriage return link 58 (FIGURE 2) upon initiation of a carriage return operation so as to effect connection of the typewriter motor power shaft 59 to the draw band drum 60. Details of this structure are more fully described in Patent 2,729,322. In order that the clutch cone 57 may be maintained toward the right until the carriage has reached the end of its return movement, latching means similar in principle to that disclosed in Patent 2,567,937 is employed. In order to release the latching means, comprising a latch arm 61, when the carriage reaches the end of its return travel, a knock off lever 62 is provided. As shown in FIGURE 3 the knock off lever 62 is pivotally mounted on the rear typewriter frame 63 and adapted to be rocked clockwise whereby its lower extremity 64 will engage a tail portion 65 of latch arm 61 thereby to release the latching means and permit disengagement of the clutch cone 57. Clockwise movement of the knock off lever 62 is effected as follows: Just before the carriage reaches the end of its return movement determined by the setting of a margin stop 66, a screw 67 on the stop will engage the upper end of a cushion lever 68 pivotally mounted on the center post 69 of the typewriter, so as to rock the latter against the urge of a cushioning spring 70. Rocking of cushioning lever 68 pulls a link 71 which is connected to the knock off lever 62.

In accordance with the invention the Royal Electric construction is modified by the addition of a Form C switch 72 suitably mounted on the frame 63 for actuation by the clutch knock off lever 62 whereby as will hereinafter appear the line feed key puller solenoid 11 will be energized.

Figure 4:
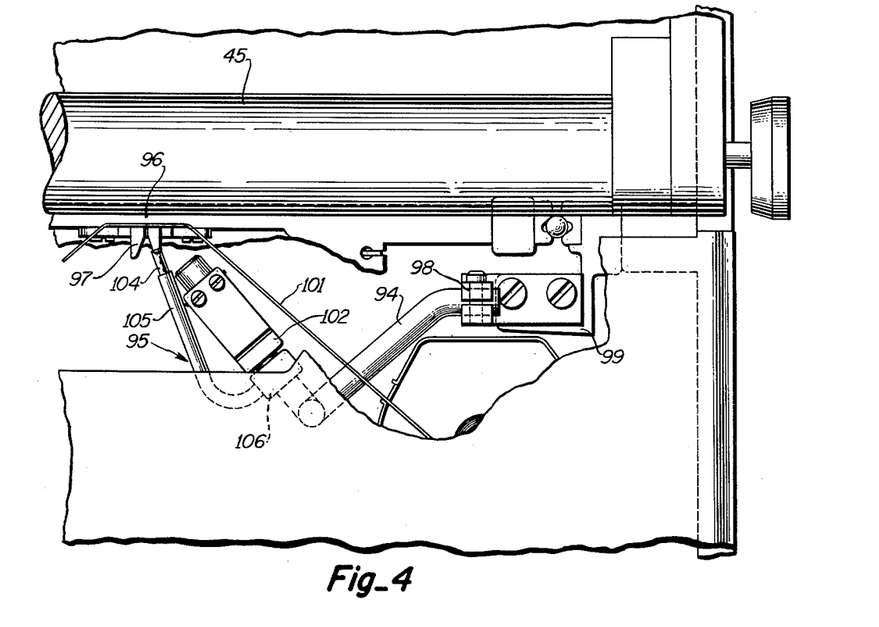
FIGURE 4 is a top view showing the mounting of the sensing unit in relation to the typewriter.
Figure 5:
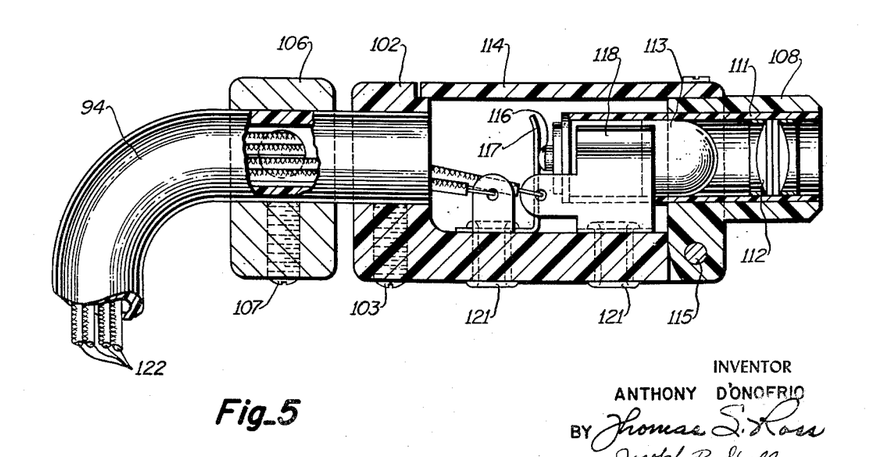
FIGURE 5 is a side view in cross section of the sensing unit.

The photoelectric sensing unit comprises as seen in FIGURES 4 and 5 a support 94 for adjustably positioning a photocell and light source assembly generally designated by reference 95 in the vicinity of the printing point 96 of the typewriter which is always opposite the throat of the type guide or print station 97. The support 94 which takes the form of hollow tubing is secured at one end in a split clamping collar 98 secured to the typewriter frame at 99 whereby it may be rotatably and longitudinally adjusted. The tubing extends toward the interior of the typewriter below the inked ribbon 101, and upwardly, terminating in a lamp housing 102 wherein it is secured as by a set screw 103 (FIGURE 5). The photocell 104 of the assembly is mounted in tubing 105 which is secured to a collar 106 adjustably secured to support tubing 94 as by a set screw 107 (FIGURE 5). The adjustable mountings are provided whereby the photocell may be brought close to and preferably to within $\frac{1}{8}''$ of the printing point 96 on the platen 45.

Referring more particularly to FIGURE 5 the light housing is formed with a lens housing 108 wherein is mounted a sleeve 111 adapted to receive a double convex lens assembly 112 and a lamp 113. The upper and forward portions 114 of the housing are hinged as at 115 whereby the housing may be opened to permit insertion and/or removal of the lamp 113 within or from the sleeve 111. As seen in FIGURE 5 when the housing is closed the base terminal 116 of the lamp contacts a resilient terminal 117 and the sleeve terminal of the lamp is gripped by a C-shaped resilient terminal 118. Terminals 117 and 118 are suitably secured to the lamp housing by rivets 121. Conductors 122 connected to the lamp and photocell are brought through the tubing and connected to control circuitry preferably on printed circuit cards mounted to the rear of the typewriter.

The photocell 104 is of the photoconductive type which, as is understood by those conversant with the art, varies its electrical resistance in accordance with the light intensity received; more particularly the resistance varies inversely with light intensity received. The photoconductive cell used in the invention is preferably one employing diffused silicon as the photosensitive element. Such a photoconductive cell is sold by Texas Instrument Corporation as an 1N2175 and is characterized by a two microsecond rise time, a 20 microsecond decay time, and a high dark current.

The characteristic of such a cell is such that increases in ambient illumination will shift the bias voltage along the load line with the changes in photocell current becoming greater as the level of illumination increases. This indicates that the higher the ambient illumination, the greater the change in photocell current when the illumination drops, as by passage of a position control mark past the field of "vision" of the photocell. Hence high ambient light intensity supplied primarily by lamp 113 renders the cell more sensitive.

The lamp 113 employed in the invention is a tungsten filament lamp operated at a color temperature of 2878 K. and the light assembly is designed to project the image of the lamp filament. The image spot of light on the printing point preferably is in the form of a rectangle or a circle such that rectangular position control marks, preferably .020" x .060", when immediately at the printing point blank the area defined thereby if a rectangle, or are completely enclosed within the circular area. The lamp 113 is disposed behind the lens 112 a distance preferably equal to the focal length of the lens, and the light lens assembly is mounted so as to deliver approximately one foot candle of illumination at the printing point. The projected light upon hitting the paper on the curved surface of the platen 45 is diffusely reflected. The diffusely reflected light illuminates a volume of space in front of the printing point and it is within this volume that the photoconductive element is disposed. More particularly in order that a high output signal and a good signal to noise ratio may result the photoconductive cell 104 is placed approximately ⅛″ from the printing point, slightly away from the projected axis of lens, and out of the path of type bars.

Figure 6:
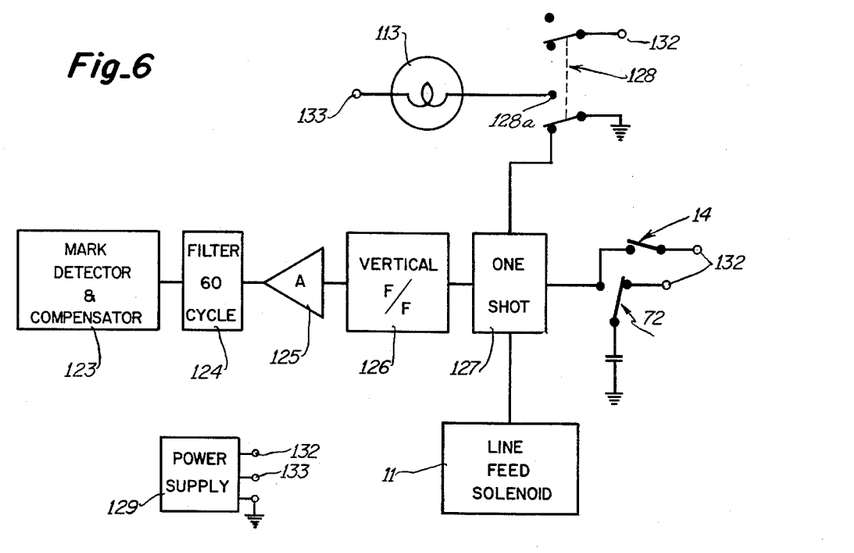
FIGURE 6 is a block diagram of the system circuitry.

Referring now to FIGURE 6 there is shown a block diagram of the system comprising a mark detector and compensator 123 which, as will hereinafter be more fully described, includes circuitry for compensating for changes in surrounding ambient light and changes in reflected light due to paper variations. The output of unit 123 is fed through a filter 124 and to an amplifier 125 whose output is connected to a flip-flop circuit 126. The flip-flop circuit is connected to a one shot multivibrator 127 which in turn is operatively associated with the line feed solenoid 11. The one shot multivibrator 127 is adapted to be controlled upon closure of the heretofore mentioned skip switch 14 and carriage return switch 72. A double Form C switch generally designated by reference 128, manually operable by a switch (not shown) provided on the typewriter keyboard is operated to the manual postion shown in FIGURE 6 whenever automatic format control is not desired. As will be evident with reference to FIGURE 8, with the switch in the manual position the one shot multivibrator 127 will be disabled as will the ambient light source 113.

Actuation of either the skip switch 14 or the carriage return switch 72 will operate the one shot multivibrator 127 whereby the line feed solenoid 11 will be energized. The one shot multivibrator 127 will be cycled again if during the resultant line feed motion a control mark is sensed as will hereinafter more clearly appear.

Figure 7:
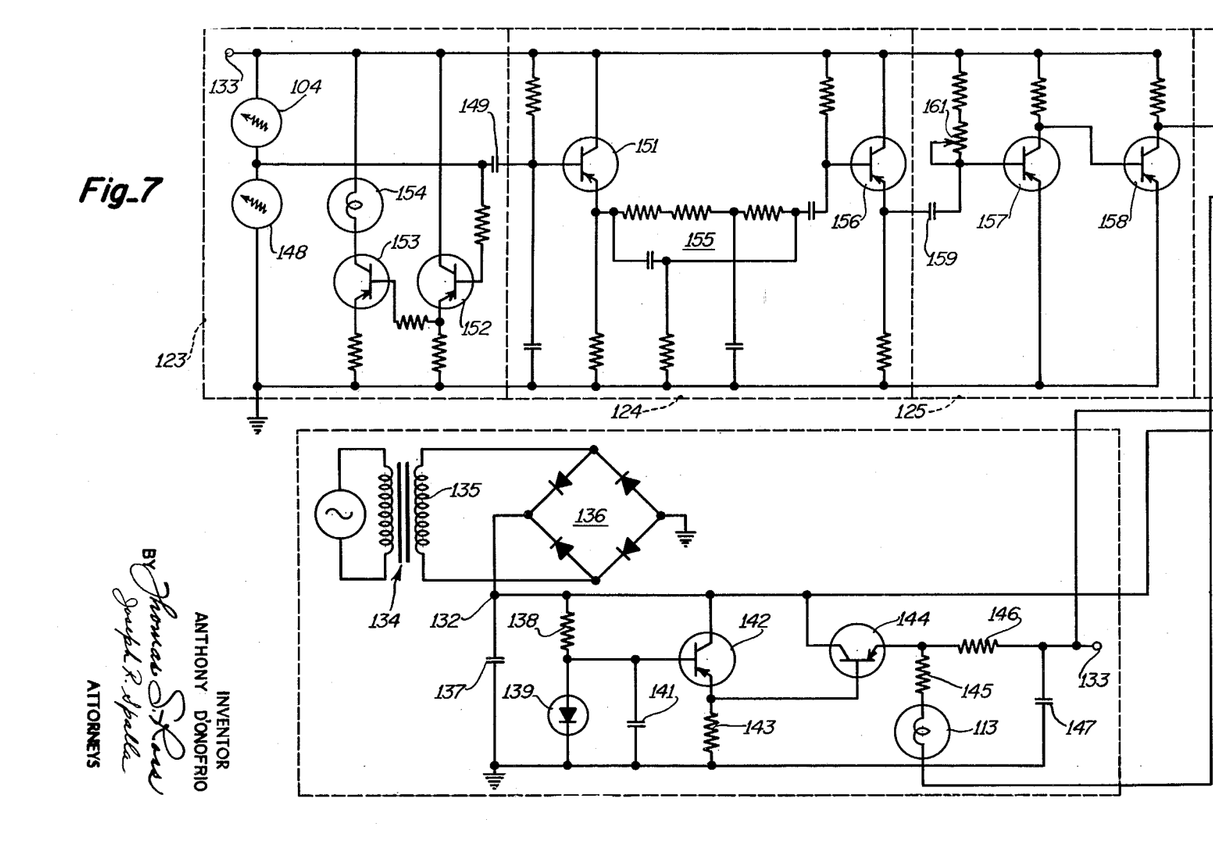
FIGURES 7 and 8 together comprise a schematic diagram of the circuitry of FIGURE 6.
Figure 8:
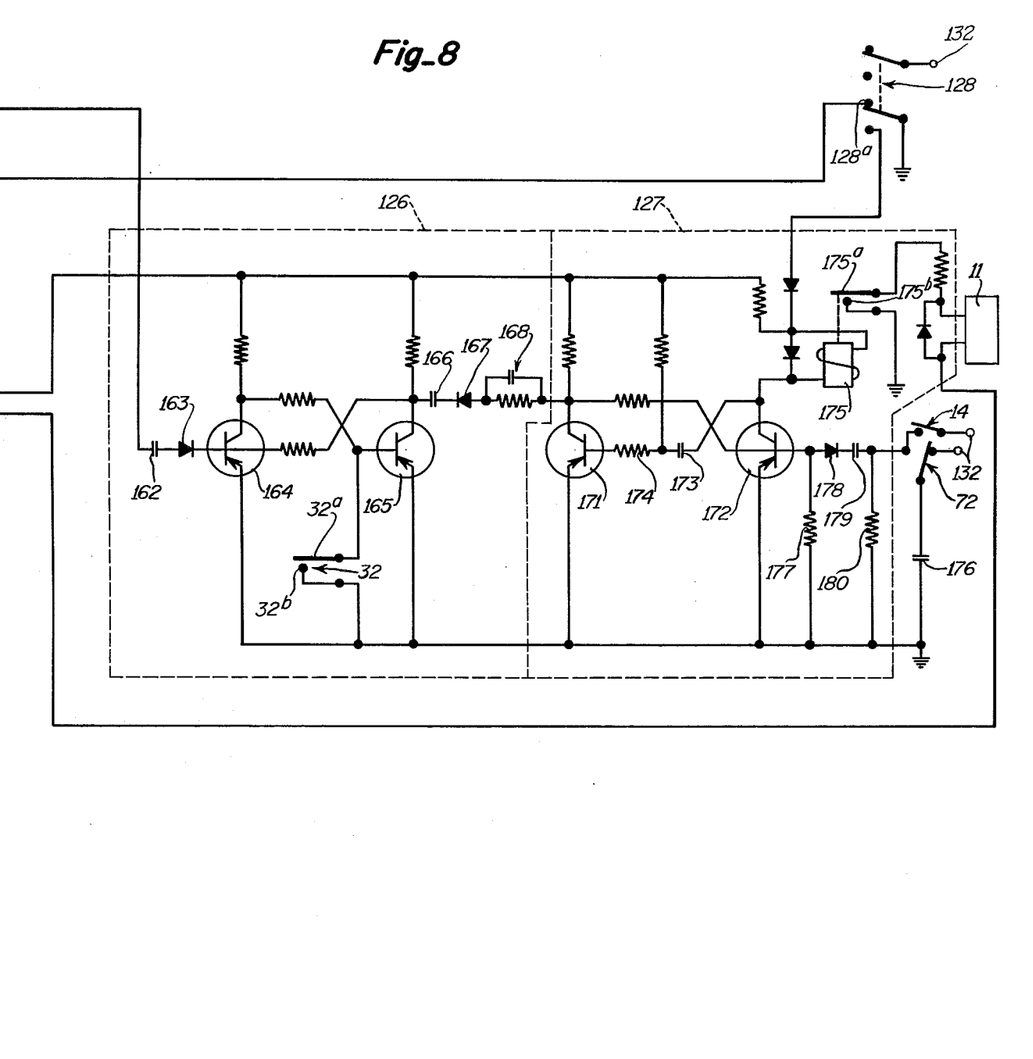

The power supply 129 shown in FIGURES 6, 7 and 8 is adapted to deliver an unregulated D.C. voltage across terminal 132 and ground and a regulated D.C. voltage across terminal 133 and ground. The regulated voltage is necessary so that the sensitivity of the system will not vary with source of voltage fluctuations. As shown in FIGURE 7 the regulated and unregulated D.C. voltages are obtained from a 110 volt A.C. source through a step down transformer 134; the secondary winding 135 of which is connected to the diagonals of a full wave bridge rectifier 136 whose opposite diagonals are connected across a shunt capacitor 137 thereby developing an unregulated voltage on terminal 132. In parallel with the shunt capacitor 137 is a resistor 138 in series with a zener diode 139 shunted by a capacitor 141. A PNP power transistor 142 having its base and emitter electrodes connected across capacitor 141 is connected for operation as an emitter follower; the voltage across the emitter resistor 143 being connected to the base electrode of a PNP transistor 144 having its emitter connected to ground through a resistor 145, the lamp 113 providing the light source for the mark detecting photocell 104, and contact 128a (FIGURE 8) of the format control switch 128. The emitter of transistor 144 is also connected to ground through a resistor 146 and a filter capacitor 147 in parallel with the lamp circuit. The regulated voltage across capacitor 147 is employed to supply the system components. The zener diode 139 as is understood sets the base voltage of the transistor 142 by passing current when the voltage exceeds the desired bias due to voltage fluctuations of the power supply.

As seen in FIGURE 7 a voltage divider is provided comprising the mark detector photocell 104 and a light and paper variation compensating photocell 148. The output of the divider is coupled through a condenser 149 to a PNP emitter follower transistor 151 and is also directly connected to the base electrode of an emitter follower transistor 152. The emitter of transistor 152 is connected to the base electrode of a transistor amplifier 153 having a lamp 154 connected in its collector circuit. The lamp 154 is associated with the light and paper variation compensating photocell 148. The response time of photocell 148, preferably a Clairex CL-2, is much slower than the response time of the mark detector photocell, being on the order of 20 milliseconds. Preferably, both the photocell 148 and lamp 154 are mounted on printed circuit cards suitably mounted at the rear of the machine; the printed circuit cards also carrying the transistors, capacitors, and resistors employed.

The mark detector photocell 104 located approximately ⅛″ from the platen as heretofore stated will change its resistance when sensing a mark; i.e. when a mark passes the printing point, the light directed thereon by lamp 113 is absorbed rather than reflected so that the intensity of illumination in the volume of diffused light within which the cell is located decreases, and as a consequence its resistance increases. The change in resistance will change the divider output voltage which will then be amplified for control purposes. The compensating photocell 148 comprising the divider is adapted to reduce changes in divider output voltage due to surrounding ambient light variations and paper variations affecting the amount of reflected light. As the divider voltage tends to change due to such variations, which variations occur only gradually, the change is effective through transistors 152 and 153 and to increase or decrease the output of lamp 154 and thereby decrease or increase the resistance of compensating cell 148 thereby keeping the output voltage of the divider constant. When sensing a mark the resistance of detector cell 104 increases and the pulse resulting is of such short duration, due to the fast rise and decay response time of the cell 104, that no compensation by the more slowly acting compenasting cell 148 can be effected.

The mark sense pulse at the emitter of transistor 151 is passed through the filter section 124 comprising a twin T filter generally designated by reference character 155 to keep the input to the amplifier section 125 free of 60 cycle noise pickup due to the high impedance of the voltage divider. The filter output is in turn applied to the base electrode of an emitter follower transistor 156 which together with emitter follower transistor 151 matches the high impedance output of the signal source to the low impedance input to the amplifier 125 comprising cascaded PNP transistors 157 and 158.

As seen in FIGURE 7 the voltage developed across the emitter resistor of transistor 156 is coupled through a condenser 159 to the amplifier section 125 through a bias rheostat 161 whereby the amplified output signal level may be controlled so as to reduce the amplitude of noise to an ineffective level and signal voltage amplitudes developed by marks less than a predetermined width to an ineffective level.

As shown in FIGURE 8, the amplifier output is coupled to the flip-flop circuit 126 through a capacitor 162 and a diode 163 adapted to pass positive pulses. The flip-flop circuit is of conventional construction and comprises transistors 164 and 165 having their collectors and bases directly cross connected. The base of transistor 164, which transistor is normally conducting, is connected to the output of the amplifier 125 with the result that the positive pulses will cut transistor 164 off thereby rendering 165 conductive. The base of transistor 165 is adapted to be connected to ground through the normally open line feed switch 32 and when grounded by closure of the switch contacts 32a and 32b will cut transistor 165 off thereby rendering 164 conductive. The collector of transistor 165 is coupled through a capacitor 166 and a diode 167 poled to pass negative pulses, and an RC pulse shaping circuit 168 to the collector of a transistor 171 which in turn is directly connected to the base of a transistor 172; transistors 171 and 172 comprising the one shot multivibrator 127. The collector of transistor 172 is coupled to the base of transistor 171 through a capacitor 173 and a resistor 174 chosen to provide a desired cyclic period on the order of 120 milliseconds which is more than the time for a line feed motion which is approximately 100 milliseconds. Obviously if faster line feed operation were desired more lobes could be provided on the cam 16; e.g. with four lobes a line feed motion would be 25 milliseconds and the one shot period could be made 30 milliseconds. The collector of transistor 172 is also connected to the negative supply terminal 133 through a relay 175 adapted to operate contacts 175a and 175b which are connected in the line feed solenoid circuit. The base electrode of transistor 172 is adapted to be driven negative to conduction upon operation of either of the carriage return and skip switches 72 and 14 respectively. The carriage return switch 72 comprises a Form C contact which normally connects negative terminal 132 across a capacitor 176 whereby it is normally charged so that upon carriage return actuation and momentary operation of switch 72, charged capacitor 176 will be connected across the base emitter electrodes of transistor 172 through a pulse circuit comprising resistor 177, diode 178, capacitor 179 and resistor 180 thereby applying a negative pulse on the base of transistor 172 thereby to render it conductive. As is apparent closure of skip switch 14 also connects negative terminal 132 to the base of transistor 172.

Figure 9:
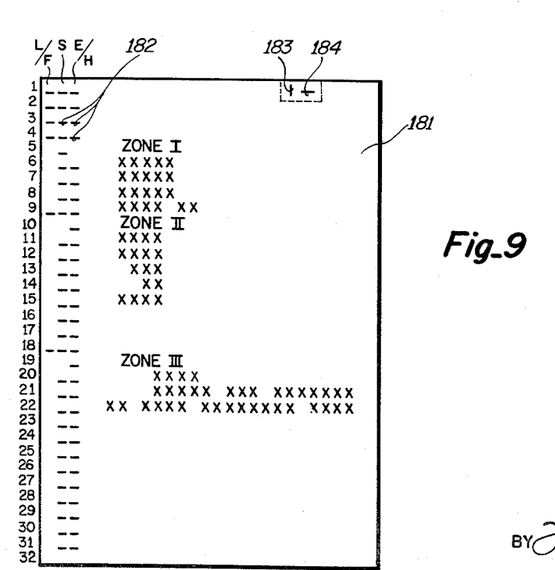
FIGURE 9 is a plan view of an exemplary form.

Referring now to FIGURE 9 there is shown a form 181 upon which data is to be inserted. The form carries an exemplary program comprising line feed control marks 182. It is to be here noted that the form does not have to be specially prepared inasmuch as control marks may be pencilled or inked in by hand. However, a prepared form with marks printed thereon in accordance with a particular format is preferred; with the line feed control marks 182 positioned between typing lines. The thickness of the control marks is not critical inasmuch as the sensitivity of the mark detector amplifier may be adjusted so that only marks of a predetermined thickness or greater will be operative to effect control. Preferably the thickness of the control marks is equivalent to the width of a rectangular light spot or ⅓ the diameter of a circular light spot directed toward the print point. This means that the greatest change in reflected light and consequently photocell resistance will occur when the mark is centered on the spot of light. The signal amplitude resulting from a change in resistance due to the detection of a mark whose width is less than predetermined will not be effective to operate the flip-flop 126, as heretofore explained, through adjustment of rheostat 161. As will be more clearly evident hereinafter the line feed marks are selectively located in every position immediately before the lines where the entry of data is not required. This means that the marks are effective to continue line feed movement.

As shown in FIGURE 11 the left hand margin of the form is provided with three columns designated line feed (L/F), skip (S) and eject or home (E/H); each of these columns carries line feed control marks selectively printed thereon. The marks in the L/F column normally control line feed mechanism operation. The S or E/H columns may be employed to control line feed mechanism operation simply by letter spacing one or two spaces respectively through space bar depression thereby placing the S or E/H column in line with the printing station.

With the form shown in FIGURE 9, or a continuous form, a pin feed platen being provided for the latter as will be understood, rolled into the machine until the top of the form is in front of the printing station an operator may align the form through the use of vertical and horizontal positioning marks 183 and 184 provided on the top line of the form.

As shown typing is to begin in a zone I of the form, the first line of typing thereon being on line 6 of the form. To get to line 6 an operator is required to initiate a carriage return operation to bring column L/F beneath the printing point of the typewriter, the left hand margin stop 66 having been so set.

Depression of the carriage return key effects the engagement of an associated pawl with the typewriter snatch roll whereby the carriage return link 58 is pulled. This effects the engagement of the carriage return clutch, latching it over the carriage return interval. When the margin stop 66 carried by the carriage strikes the frame mounted center post the carriage return knockoff lever 62 is rocked about its pivot thereby momentarily operating the contacts of switch 72. Upon return of lever 62 to normal, the contacts of switch 72 return to normal as shown in FIGURE 8. The momentary closure of the contacts of switch 72 connects charged capacitor 176 across the base emitter electrodes of transistor 172 in the one shot multivibrator circuit; the resulting pulse rendering transistor 172 conductive for an interval depending on the multivibrator period.

Conduction of transistor 172 will energize relay 175 which will close its contacts 175a and 175b thereby connecting power across the line feed solenoid 11; energization thereof pulling cam follower 13 into the plane of cam 16 initiating the first line feed. If during platen rotation a mark is detected as it moves in front of the printing station, the resulting signal will change the state of flip-flop 126 rendering transistor 165 conductive; the positive pulse at its collector however being ineffective on the one shot multivibrator which is still in its transient state. At the end of platen rotation the line feed switch 32 will close grounding the base of transistor 165 whereby flip-flop 126 will change back to its original state. The resulting negative pulse on the collector of 165 will prevent the one shot multivibrator from flipping back to normal thereby effecting the continued energization of the line feed solenoid 11. The process will repeat until no mark is sensed in a subsequent line feed cycle thereby permitting the one shot multivibrator to return to quiescent state and the line feed solenoid to drop out as a result thereof.

Referring again to the form shown in FIGURE 9 it will be apparent that upon initiation of a carriage return operation, line feed operation will be initiated as explained above and, due to the presence of marks on the forms between lines 1 and 5, will continue through four cycles. Inasmuch as no mark is present between lines 5 and 6, when the platen rotates through its fifth cycle and no mark is detected transistor 164 will not change state with the result that the one shot multivibrator will cycle to its quiescent state, relay 175 will drop out and line feed solenoid 11 will drop out whereby line feed operation will stop. Hence line 6 will be positioned on the typing line. After writing on line 6, the operator will call for a carriage return which will effect a line feed as heretofore explained and since no mark is present between lines 6 and 7, no further line feed will occur.

After carriage returning in line 7 only a single line feed will obtain inasmuch as no mark is present between lines 7 and 8. The same is true after carriage returning in line 8. Carriage returning on line 9 will also effect a line feed but during the feed between lines 9 and 10 a mark will be sensed thereby permitting another line feed. Since there is no mark between lines 10 and 11, line feed will stop with the form positioned to receive typing on line 11.

To insert typing in zone II an operator need only carriage return to properly position the form to the indicated typing positions and to effect line feeds between lines. If all the space allotted to zone II is not required as for example only lines 11—15 were necessary, the operator may move the form to zone III by effecting repeated carriage return operations which will bring lines 16—18 to the printing line successively; line feed operation stopping on each line. A carriage return in line 18 will effect two line feed operations due to the presence of marks between lines 18 and 19 thereby bringing line 20, the first line in zone III to the printing line. Another method of moving from line 16 to line 20 which is preferred may be effected by letter spacing the carriage on line 16 to bring the skip column before the print station and then depressing the skip key 15 which initiates a line feed operation by energizing solenoid 11 as heretofore described. Since the skip column is now before the print station, the presence of marks therein between lines 16, 17, 18, 19 will automatically permit repeat line space operations until line 20 is at the printing line.

Typing in zone III will be as in zone II, carriage returning effecting form progress. After typing in the last line, e.g. line 22, an operator may eject the form by carriage returning repeatedly, or by carriage returning, and then letter spacing one space to the skip column and then depressing the skip key.

Where continuous forms are employed an operator may move from the last line of typing in one form to the first typing line in zone I of the next form by carriage returning; letter spacing two spaces to bring the home control column beneath the printing station and then depressing the skip key. As seen line spacing will continue until no mark in the home column is sensed which will be between lines 5 and 6 of the next form, assuming the next form has the same format as the one preceding it.

In similar fashion overflow, the condition where the space allotted in a zone is insufficient, may be accommodated in a corresponding zone in a succeeding form by providing an overflow column, similar to the other three with marks disposed between all the lines except before the line in which typing is to resume in the next form.

To obtain line feed operation while in manual only requires that the shield 56 (FIGURE 2) be positioned so as to effect single, double, or triple line spacing immediately before a carriage return operation when such an operation is initiated. Repeat line feed operation will be as described, the lever 27 being operated by a key depression.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. In a typewriter having a carriage adapted for movement in letter feed and carriage return directions including a platen adapted to be indexed whereby a worksheet supported by said carriage may be fed in vertical direction, said worksheet bearing vertically aligned aperiodically spaced marks on predetermined typing lines in accordance with a predetermined worksheet format, means for initiating an incremental platen indexing movement, means for detecting said marks at the typewriter printing station, and means responsive to each detected mark for effecting a subsequent indexing movement of said platen.

2. In a typewriter having a carriage adapted for movement in letter feed and carriage return directions including a platen adapted to be indexed whereby a worksheet supported by said carriage may be vertically indexed, said worksheet bearing vertically aligned aperiodically spaced marks on predetermined typing lines in accordance with a predetermined worksheet format, means for initiating indexing movement of said platen, means for detecting said marks passing immediate in front of the typewriter printing station as said worksheet moves past the printing station of said typewriter, means responsive to indexing movement of said platen, means responsive to detected marks and to said movement responsive means, and means responsive to said last named means for controlling said means for initiating indexing movement thereby to effect an additional indexing movement of said platen in response to each mark detected.

3. Apparatus as recited in claim 2 wherein said mark detecting means comprises means for illuminating said worksheet immediately in front of said printing station, and a photoresponsive device disposed within a volume of light diffusely reflected from said worksheet operable by changes in illumination in said volume caused by marks passing in front of said printing station.

4. Apparatus as recited in claim 2 wherein said means responsive to detected marks and to said movement responsive means comprises a flip-flop circuit, one half of which is responsive to mark signals and the other half of which is responsive to platen indexing movement if said first half has been operated by a mark signal.

5. In a typewriter having a carriage adapted for movement in tabulating and return directions, said carriage having mounted thereon a platen adapted to be indexed whereby a worksheet supported by said carriage may be moved in vertical direction relative to the printing station of said typewriter, said worksheet having marks thereon at selected positions which are to be indexed past, means for illuminating said worksheet immediately in front of said printing station, a photocell responsive to changes in illumination at the printing station of said typewriter as a mark passes said printing station, control circuitry, means in said control circuitry responsive to a carriage return operation for initiating a line feed operation after a carriage return, means responsive to detected marks for conditioning said control circuitry, and means operable in response to a line feed movement for operating said conditioned control circuitry whereby a mark sensed during a line feed movement is effective to initiate another line feed movement, said line feed movement terminating where no mark is sensed during line feed movement.

6. The combination with a printing machine having means for supporting a worksheet for movement past the printing station of said machine, said worksheet having marks selectively printed thereon in a vertical column for controlling the progress of said worksheet relative to said printing station, means for aligning said column of marks with said printing station, means responsive to said aligning means for initiating movement of said worksheet relative to said printing station, and means responsive to the passage of said marks past said printing station for maintaining said last named means operative.

7. The combination with a printing machine having means for supporting a worksheet for movement past the printing station of said machine, said worksheet bearing vertically aligned aperiodically spaced marks on predetermined printing lines for controlling the progress of said worksheet relative to said printing station in accordance with a predetermined worksheet format, electromagnet means for effecting an incremental line feed movement of said worksheet relative to said printing station, controlled means for initiating the energization of and for maintaining said electromagnet means energized over an incremental line feed interval, and detector means responsive to the passage of a mark past said printing station during said interval operative on said controlled means to maintain said electromagnet means energized over another line feed interval.

8. Apparatus as recited in claim 7 wherein said controlled means comprises a one shot multivibrator, said electromagnet means being associated with the normally nonconducting half of said multivibrator, and means for changing the state of said multivibrator for initiating the energization of said electromagnet means.

9. Apparatus as recited in claim 7 wherein said detector means comprises a photoconductive cell responsive to changes in light intensity in a zone immediately before said printing station due to the passage of said marks past said printing station.

10. The combination with a printing machine having means for supporting a worksheet for movement past the printing line of said machine, said worksheet bearing vertically aligned selectively spaced marks on predetermined typing lines for controlling the progress of said worksheet relative to said printing line in accordance with a predetermined worksheet format, of electromagnet means adapted when energized to initiate incremental movement of said worksheet relative to said printing line, a one shot multivibrator having a period at least as great as the time necessary to accomplish an incremental movement of said worksheet, said electromagnet means being associated with the normally nonconducting half of said multivibrator, means for switching the state of said multivibrator for initiating the energization of said electromagnet means, means for generating signals in response to marks passing the printing station of said machine, and means responsive to said signals and to each incremental movement of said worksheet for maintaining said multivibrator in its switched state over another period.

11. The combination with a printing machine having means for incrementally moving a record bearing marks selectively printed thereon, and a motive source, of electromagnet means adapted when energized to couple said motive source to said record moving means, circuit means operative to initiate the energization of and for maintaining said electromagnet means energized over a time interval at least equivalent to the interval necessary to accomplish an incremental indexing of said record, means for rendering said circuit means operative, means for generating signals in response to marks sensed during movement of said record, switch means responsive to said record moving means at the termination of record movement, and means responsive to said signals and said switch means for maintaining said circuit means operative.

12. In a typewriter having a carriage adapted for movement in letter feed and return directions including a platen adapted to be indexed whereby a worksheet supported by said carriage may be fed in a vertical direction, said worksheet having marks selectively positioned thereon in a vertical array on predetermined typing lines in accordance with a predetermined worksheet format, means for initiating a line feed movement, a mark detector, and means responsive to a mark detected during said line feed movement and to the termination of said line feed movement operative on said means for initiating a line feed movement to effect the initiation of another line feed movement.

References Cited in the file of this patent

UNITED STATES PATENTS

| | | |
|---|---|---|
| 2,111,619 | Fleming | Mar. 22, 1938 |
| 2,181,992 | Ghertman | Dec. 5, 1939 |
| 2,424,073 | Ayers | July 15, 1947 |